(12) United States Patent
Zafarana (10) Patent No.: US 11,750,099 B2
(45) Date of Patent: *Sep. 5, 2023

(54) METHOD AND SYSTEM OF A QUASI-CONSTANT ON-TIME CONTROLLER

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,302

(22) Filed: Oct. 10, 2022

(65) Prior Publication Data

US 2023/0063009 A1 Mar. 2, 2023

Related U.S. Application Data

(63) Continuation of application No. 17/248,513, filed on Jan. 28, 2021, now Pat. No. 11,502,605.
(Continued)

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 1/0006* (2021.05); *H02M 1/0025* (2021.05)

(58) Field of Classification Search
None
See application file for complete search history.

(56) References Cited

U.S. PATENT DOCUMENTS 8,040,114 B2 * 10/2011 Saint-Pierre ........ H02M 1/4225
323/222
8,493,048 B2 7/2013 Zhang
(Continued)

FOREIGN PATENT DOCUMENTS

CN 114070046 A 2/2022

OTHER PUBLICATIONS

Lin, Hung-Chih. et al., "A Current Mode Adaptive On-Time Control Scheme for Fast Transient DC-DC Converters," IEEE Publication No. 978-1-4244-1684-4/08/$25.00, Apr. 2008, pp. 2602-2605, Copyright 2008 IEEE.
(Continued)

*Primary Examiner* — Matthew V Nguyen
(74) *Attorney, Agent, or Firm* — Dickinson Wright PLLC; Mark E. Scott (57) ABSTRACT

Quasi-Constant On-Time Controller. At least one example embodiment is a method of operating a power converter, comprising: charging an inductor of a switching power converter, each charging has an on-time; and then discharging the inductor while providing current to the load; and repeating the charging and the discharging at a switching frequency. During the repeating, the example method may comprise: adjusting the switching frequency proportional to a voltage difference between an output voltage and a setpoint voltage; generating an on-time reference proportional to a frequency difference between the switching frequency and a setpoint frequency, the on-time of each charging of the inductor is based on the on-time reference; and modifying the on-time proportional to the voltage difference.

20 Claims, 7 Drawing Sheets

Related U.S. Application Data (60) Provisional application No. 62/706,759, filed on Sep. 9, 2020.

(56) References Cited

U.S. PATENT DOCUMENTS

| | | | | |
|---|---|---|---|---|
| 9,116,538 | B2* | 8/2015 | Saint-Pierre | G05F 1/70 |
| 11,502,605 | B2* | 11/2022 | Zafarana | H02M 3/158 |
| 2011/0317459 | A1* | 12/2011 | Kuebrich | H02M 1/4225 363/126 |
| 2013/0141070 | A1 | 6/2013 | Goessling et al. | |
| 2015/0188405 | A1* | 7/2015 | Ben-Yaakov | H02S 40/30 323/312 |
| 2015/0323949 | A1* | 11/2015 | Saint-Pierre | G05F 1/70 323/208 |
| 2016/0020692 | A1* | 1/2016 | Castelli | H02M 1/4208 323/205 |
| 2021/0313894 | A1 | 10/2021 | Moon et al. | |
| 2021/0328499 | A1 | 10/2021 | Drda et al. | |
| 2022/0311336 | A1* | 9/2022 | You | H02M 1/0003 |

OTHER PUBLICATIONS

Ni, Chuan et al., "Adaptive Constant On-Time (D-CAP™) Control Study in Notebook Applications," Texas Instruments Application Report No. SLVA281-Jul. 2007-Revised Dec. 2007, 9 pages, Copyright 2007 Texas Instruments Incorporated.

Tian, Shuilin et al., "Equivalent Circuit Model of Constant On-time Current Mode Control with External Ramp Compensation," IEEE Publication No. 978-1-4799-5776-7/14/$31.00, Jul. 2014, pp. 3747-3754, Copyright 2014 IEEE.

"Transient Performance Improvement for Constant On Time Control," https://cpes.vt.edu/library/viewnugget/446; 4 pages, Oct. 28, 2020, Copyright 2020 Virginia Tech Center for Power Electronics Systems.

Zhen, Shaowei et al., "Transient Response Improvement of DC-DC Converter by Current Mode Variable on Time Control," IEEE Publication No. 978-1-5386-7392-8/18/$31.00, Aug. 2018, pp. 603-606, Copyright 2018 IEEE.

\* cited by examiner

METHOD AND SYSTEM OF A QUASI-CONSTANT ON-TIME CONTROLLER

CROSS-REFERENCE TO RELATED APPLICATIONS

This application is a continuation of U.S. application Ser. No. 17/248,513 filed Jan. 28, 2021 titled "Method and System of a Quasi-Constant On-Time Controller." The '513 application claims the benefit of U.S. Provisional Application Ser. No. 62/706,759 filed Sep. 9, 2020 and titled "Quasi Constant On-Time Controller." Both applications are incorporated by reference herein as if reproduced in full below.

BACKGROUND

Constant on-time controllers are used in situations where the power drawn by a downstream circuit is subject to steep load transients. For example, constant on-time controllers may be used to supply power to processors, such as multi-core processors. The power drawn by a processor is highly variable and dependent upon loading of the processor—a processor may go from lighted loaded to fully loaded and then back to lightly loaded over the course of just a few seconds. While constant on-time controllers are well suited for steep load transients, it nevertheless may be difficult for a constant on-time controller to adequately maintain voltage in some situations.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a comparator may have an inverting input and a non-inverting input. These "inputs" define electrical connections to the comparator, and shall not be read to require inputting signals to the comparator.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a digital signal processor (DSP), a processor with controlling software, a programmable logic device (PLD) or a field programmable gate array (FPGA), configured to read inputs and drive outputs responsive to the inputs.

"Proportional" in reference to a control action responsive to a signal (e.g., voltage difference, or a voltage error) shall not include a control action having a magnitude proportion to a rate of change of the signal. For example, in a Type III Compensation Network Type implementing (e.g., proportional-integral-differential (PID) control), recitation of a proportional control action shall not encompass a derivative-only control action.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed quasi-constant on-time controllers. More particularly, example embodiments are directed to controllers that implement a primary response to load changes by adjusting the switching frequency, a secondary response (slower than the primary response) that adjusts or controls the on-time to bring the switching frequency back to the nominal switching frequency, and a bypass response that modifies the on-time of a charge mode during the charge mode itself if steep load transients occur. The specification turns to an example system.

Figure 1:
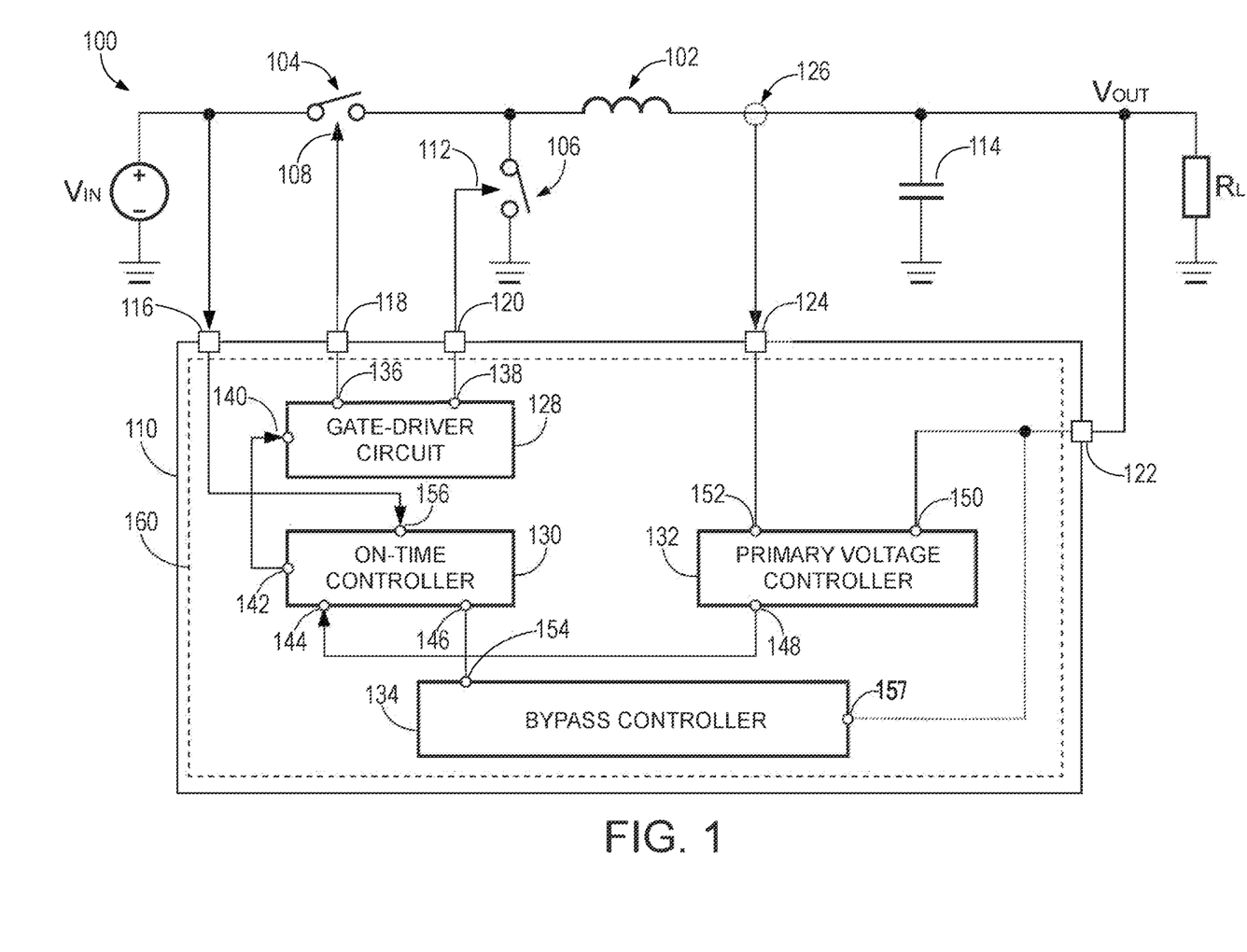
FIG. 1 shows a switching power converter in accordance with at least some embodiments.

FIG. 1 shows an example switching power converter 100. In particular, the switching power converter 100 comprises an input voltage $V_{IN}$ illustratively shown as a voltage source, though the input voltage $V_{IN}$ may be provided from an upstream power converter. In many situations the voltage provided by the input voltage $V_{IN}$ is higher than the voltage needed for load $R_L$. For example, the input voltage $V_{IN}$ may be five volts, while an example load $R_L$ (e.g., a processor) may utilize a supply voltage of 3.3 volts. Thus, the example switching power converter 100 may be a buck-type switching power converter. The switching power converter 100 comprises an inductor 102. In operation, a first lead of the inductor 102 is alternately coupled to the input voltage $V_{IN}$ and then to ground. To that end, the example switching power converter 100 comprises an electrically-controlled switch 104 (hereafter just switch 104) and an electrically-controlled switch 106 (hereafter just switch 106). While the switches 104 and 106 are shown as single-pole, single throw mechanical switches to simply the figure, in practice each switch may be a transistor (e.g., a bipolar junction transistor, or a field effect transistor (FET)).

Switch 104 defines a current input coupled to the input voltage $V_{IN}$, a current output coupled to the first lead of the inductor 102, and a control input 108 coupled to a driver circuit 110. Switch 106 defines a current output coupled to the first lead of the inductor 102, a current input coupled to a ground reference (e.g., ground or common), and a control input 112 coupled to the driver circuit 110. The second lead or downstream side of the inductor 102 is coupled to an output capacitor 114. The second lead of the inductor 102 and/or the upper lead of the output capacitor 114 define the output voltage $V_{OUT}$ applied to the downstream load $R_L$.

The driver circuit 110 defines a voltage-sense terminal 116, high-gate terminal 118, a low-gate terminal 120, and a feedback terminal 122. The voltage-sense terminal 116 is coupled to the input voltage $V_{IN}$, both to sense the input voltage $V_{IN}$ and possibly to provide operating power to the driver circuit 110. The high-gate terminal 118 is coupled to the control input 108 of the switch 104. The low-gate terminal 120 is coupled to the control input 112 of the switch 106. The feedback terminal 122 is coupled to the output voltage $V_{OUT}$. In some cases, the driver circuit 110 can directly drive the control inputs 108 and 112 of the switches 104 and 106, respectively. In other cases, however, a separate and distinct driver circuit (not specifically shown) may be disposed between the driver circuit 110 and the control inputs 108 and 112. FIG. 1 shows that the driver circuit 110 may comprise one or more substrates of semiconductor material (e.g., silicon), such as substrate 160, encapsulated within the packaging. Bond pads or other connection points of the substrate 160 couple to electrical terminals of the driver circuit 110 (e.g., terminals 116, 118, 120, 122, and 124). While a single substrate 160 is shown, in other cases multiple substrates may be combined to form the driver circuit 110 (e.g., a multi-chip module), and thus showing a single substrate 160 shall not be construed as a limitation. Additional terminals associated with the driver circuit 110 will be present (e.g., ground, serial communication terminals), but the additional terminals are not show so as not to unduly complicate the figure.

The driver circuit 110 may be designed and constructed to operate in one several control modes. For example, the driver circuit 110 may implement hysteretic control, in which the charge mode of the inductor 102 may be started based on the output voltage $V_{OUT}$ falling below a reference voltage, and the charge mode ends when the output voltage $V_{OUT}$ rises above the reference voltage by a hysteretic amount. In other cases, the driver circuit 110 may be designed and constructed to implement voltage control, in which each charge mode of the inductor 102 may be started based on a voltage error signal crossing a ramp signal, the ramp signal having a predetermined slope. In yet still further cases, the driver circuit 110 may be designed and constructed to implement current control, in which each charge mode of the inductor 102 is started based on a control signal indicative of start current, and when current in the inductor 102 crosses the control signal indicative start current, a new charge mode begins. In cases where the driver circuit 110 implements current control, the driver circuit 110 may further define the current-sense terminal 124 coupled to a current sensor 126. The current sensor 126 is illustratively shown as a current transformer, but any suitable current sensing system (e.g., small series resistor, Hall-effect sensor) may be used.

While FIG. 1 shows the driver circuit 110 controlling a single set of switches and a single inductor (a single buck-type unit), in other cases the driver circuit 110 may control an array buck-type units supplying a single output voltage $V_{OUT}$. The array of buck-type units may be operated in staggered phases. For example, a single set of control signals for the switches may emerge from the driver circuit 110, and the set of control signals may propagate through a phase delay circuit, such that each buck-type unit operates at a specific and different phase. Current through each inductor may be summed and applied to the current-sense input 124. Thus, the discussion of the driver circuit 110 operating a single buck-type unit shall not be read as a limitation of the applicability the example driver circuit 110.

In the charge mode of the inductor 102, the switch 104 is closed or conductive while switch 106 is open or non-conductive. Thus, the input voltage $V_{IN}$ is coupled to the inductor 102. Because current through an inductor cannot change instantaneously, the current through the inductor 102 builds over time, storing energy in the field around the inductor 102. The charge mode has a duration that may be referred to as the on-time of the inductor 102. At some point thereafter, the charge mode ends and the discharge mode begins. In the discharge mode, the conductive states of the switches 104 and 106 are swapped, with switch 104 becoming open or non-conductive and switch 106 becoming closed or conductive. Again because current through an inductor cannot change instantaneously, the current through the inductor 102 continues to flow but decays over time as the field around the inductor 102 collapses. The discharge mode also has a duration that may be referred to as the off-time. In the arrangement of FIG. 1, the result of continually switching between the charge mode and the discharge mode is an output voltage $V_{OUT}$ lower than the input voltage $V_{IN}$, and a current supplied to the load $R_L$.

In accordance with example embodiments, the driver circuit 110 implements quasi-constant on-time control. Putting aside the "quasi" aspects briefly, in pure constant on-time control the charge mode of the inductor 102 is of fixed duration. As power drawn by the load $R_L$ increases, the switching frequency at which charge modes are started increases. And oppositely, as power drawn by the load $R_L$ decreases, the switching frequency at which the charge modes are started decreases. It follows that in pure constant on-time control, the switching frequency changes directly with load. Stated slightly differently, in pure constant on-time control, the driver circuit 110 controls or regulates the off-time (i.e., the duration of the discharge modes) in order to control the output voltage $V_{OUT}$.

However, varying the switching frequency may have drawbacks. For example, varying the switching frequency may produce unwanted noise and/or electromagnetic emissions that are difficult and/or expensive suppress. As another example, switching losses in the switches 104 and 106 implemented as FETs increase with increasing frequency. Thus, FETs selected for operation at a nominal frequency may produce excesses losses (e.g., heat) when operating at higher than nominal frequencies for extended periods of time.

In order to address issues surrounding changes to switching frequency, the example driver circuit 110 implements quasi-constant on-time control. In particular, the driver circuit 110 implements a primary control loop or primary response to load changes by adjusting the switching frequency. However, the driver circuit 110 also implements a secondary control loop or secondary response, slower than the primary response, and the secondary response adjusts or controls the on-time to bring the switching frequency back to the nominal switching frequency or frequency setpoint.

Consider, as an example, a situation in which the load $R_L$ in the form of a processor has a step increase in power consumption, and the power consumption remains at the higher level for an extended period of time. As the output voltage $V_{OUT}$ droops because of the increased current drawn by the processor, the driver circuit 110 initially increases the switching frequency to increase energy supplied by the inductor 102. Over time, however, the driver circuit 110 slowly increases the on-time (e.g., increases the duration of each charge mode) such that additional energy is supplied to the inductor 102 in each charge mode. Each incremental increase in on-time implemented by the secondary response results in an incremental decrease of the switching frequency implemented by the primary response, with the switching frequency eventually settling at or near the setpoint frequency.

Now consider, as an opposite example, a situation in which the processor has a step decrease in power consumption, and the power consumption remains at the lower level for an extended period of time. As the output voltage $V_{OUT}$ rises because of the decreased current drawn by the processor, the driver circuit 110 initially decreases the switching frequency to decrease the energy supplied by the inductor 102. Over time, however, the driver circuit 110 slowly decreases the on-time (e.g., decreases the duration of each charge mode) such that energy supplied to the inductor 102 in each charge mode decreases. Each incremental decrease in on-time implemented by the secondary response results in an incremental decrease of the switching frequency implemented by the primary response, eventually settling again at or near the setpoint frequency.

One potential issue with quasi-constant control using the primary response to control output voltage $V_{OUT}$ and using the secondary response to adjust switching frequency is timing of transient load changes. For example, if a driver circuit begins a charge mode, in related-art devices the charge mode continues for the full on-time regardless of whether a transient load change takes place during the charge mode. More particularly, consider a situation in which a charge mode begins, and shortly thereafter (still within the charge mode) a step decrease in power consumption occurs. Regardless of the step decrease in power consumption, the on-time continues for its full duration. Only over the course of several charge and discharge modes will the on-time be made shorter by the secondary response. Thus, though the switching power converter needs less energy to be delivered to the output, the rigidity of enforcing on-time leads to providing more current than needed, which leads to voltage excursions.

A similar issue may occur for step increases in power consumption. Consider, as an opposite example, a situation in which a charge mode begins, and shortly thereafter (still within the charge mode) a step increase in power consumption occurs. Regardless of the step increase in power consumption, the on-time continues for its previously determined duration. Only over the course of several charge and discharge modes will the on-time be made longer by the secondary response. In some cases, the beginning of the next charge mode may be limited by minimum off-time considerations. Thus, though the switching power converter needs more energy to be delivered to the output in each charge mode, the rigidity of enforcing on-time leads to providing less current than needed at the output, which again leads to voltage excursions.

Various example embodiments address, at least in part, the issues noted above by having a bypass control loop or a bypass response that can modify the on-time of a charge mode during the charge mode itself, and the modification based on a voltage difference between the output voltage $V_{OUT}$ and a setpoint voltage or voltage error. That is, in example cases the driver circuit 110 has a primary response that controls switching frequency based on the voltage error, a secondary response that controls on-time based on a frequency difference between the switching frequency and a setpoint frequency or frequency error, and a bypass response that modifies on-time (even during a charge mode) based on the voltage error. The specification now turns to a more detailed description of the example driver circuit 110.

Still referring to FIG. 1, the example driver circuit 110 comprises a gate-driver circuit 128, an on-time controller 130, a primary voltage controller 132, and a bypass controller 134. The gate-driver circuit 128 defines a high-gate output 136 coupled to the high-gate terminal 118, a low-gate output 138 coupled to the low-gate terminal 120, and a pulse-width modulation (PWM) input 140 (hereafter just PWM input 140). Based on a PWM signal applied to the PWM input 140, the gate-driver circuit 128 controls the conductive state of the switches 104 and 106, including implementing a short period in which neither switch is conductive between transitions to ensure the input voltage $V_{IN}$ is not inadvertently coupled directly to ground. In other cases the gate-driver circuit 128 may be omitted in favor of a standalone gate-driver circuit implemented external to the driver circuit 110.

The example on-time controller 130 defines a PWM output 142 coupled to the PWM input 140, a voltage-sense input 156 coupled to the voltage sense terminal 116, a set input 144, and a compensation input 146. The on-time controller 130 asserts the PWM output 142 based on assertion of the set input 144. Assertion of the PWM output 142 places the switching power converter 100 into the charge mode as discussed above. The on-time controller 130 maintains the PWM output 142 in the asserted state (e.g., maintains the charge mode) for an on-time proportional to the compensation signal received on the compensation input 146 and a frequency error. Conceptually, the example on-time controller 130 implements the secondary response of changing the on-time to bring the switching frequency back to the setpoint frequency. The example on-time controller 130 also assists in the implementation of the bypass response by adjusting the on-time, even during a charge mode, based on the compensation signal applied to the compensation input 146.

The primary voltage controller 132 defines a set output 148 coupled to the set input 144, a feedback input 150 coupled to the feedback terminal 122, and optionally a current-sense input 152 coupled to the current-sense terminal 124. The example primary voltage controller 132 is configured to assert the set output 148 (and thus the set input 144) at a switching frequency. The switching frequency of the assertion of the set output 148 is proportional to a voltage difference between the output voltage $V_{OUT}$ and a setpoint voltage or voltage error. Conceptually, the example primary voltage controller 132 implements the primary control loop or the primary response to control output voltage $V_{OUT}$ to the setpoint voltage. In hysteretic control or voltage control, the optional current-sense input 152 may be omitted. However, in cases in which the primary voltage controller 132 implements current control, the current-sense input 152 may be used to read a signal indicative of current through the inductor 102.

The bypass controller 134 defines a compensation output 154 coupled to the compensation input 146, and a voltage-sense input 157. The example voltage-sense input 157 is coupled to the feedback terminal 122 by way of a dashed line to show that the bypass controller 134 receives a signal indicative of the output voltage $V_{OUT}$, such as a signal indicative of voltage error (e.g., from the primary voltage controller 132). More detailed examples are provided below. Regardless of the source, using the signal indicative of the output voltage $V_{OUT}$ the bypass controller 134 drives a compensation signal on the compensation output 154 to implement the bypass response. More particularly still, the bypass controller 134 drives the compensation signal proportional to a voltage difference between the output voltage $V_{OUT}$ and a setpoint voltage and/or voltage error. In some cases, the bypass controller 134 drives the compensation signal proportional to the voltage error. In yet still other cases, the bypass controller 134 drives the compensation signal only directly proportional to the voltage error (e.g., implements proportional-only control).

Figure 2A:
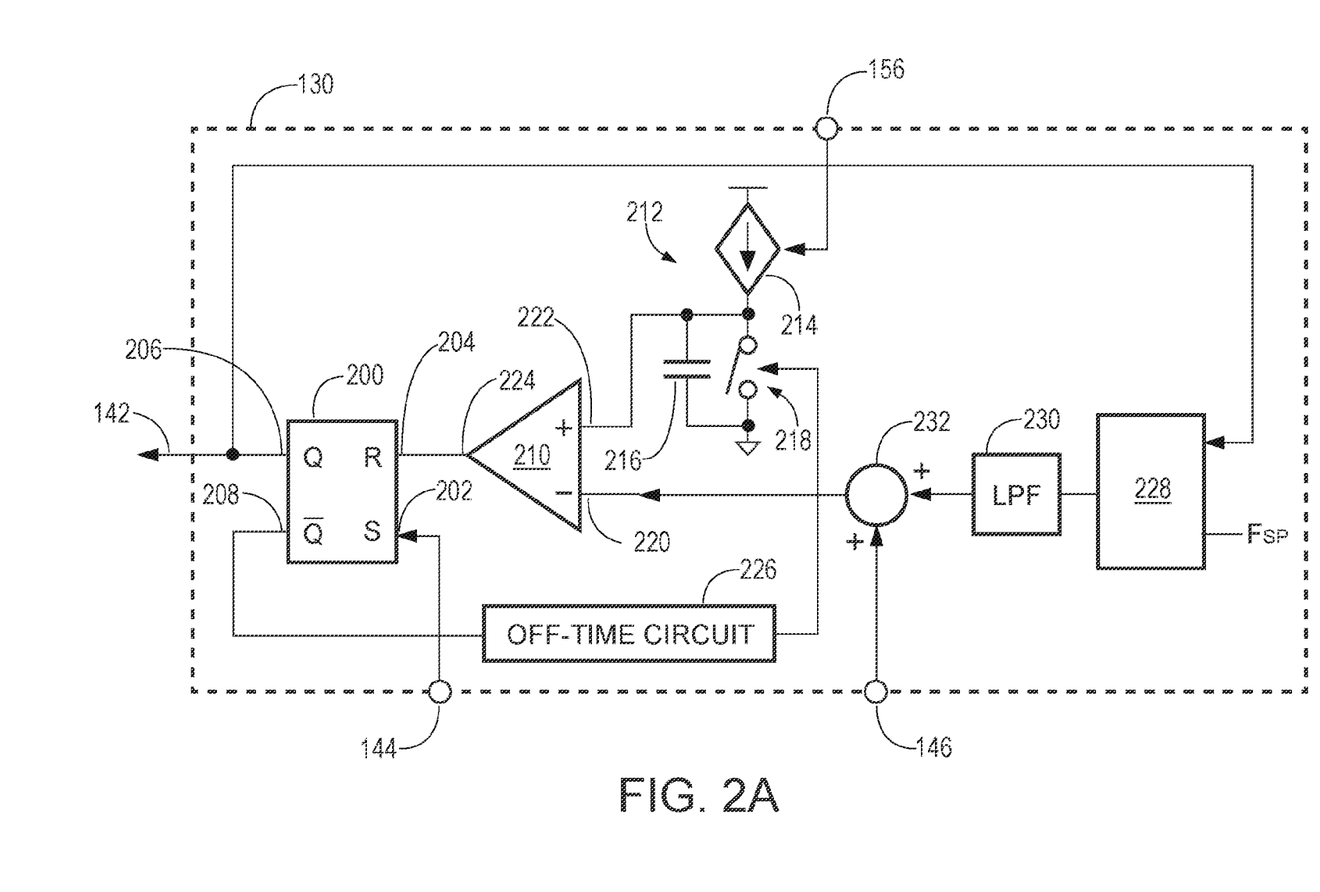
FIG. 2A shows a block diagram of an on-time controller in accordance with at least some embodiments.

FIG. 2A shows a block diagram of an example on-time controller 130. The example on-time controller 130 defines the PWM output 142, the voltage-sense input 156, the compensation input 146, and the set input 144. Internally, the example on-time controller 130 defines a set-reset (SR) flip-flop or SR latch 200. The SR latch 200 defines a set input 202 coupled to the set input 144, a reset input 204, a Q output 206, and a Q-not output 208. The SR latch 200 asserts the Q output 206 responsive to assertion of the set input 202, thus starting the charge mode. The SR latch 200 de-asserts the Q output 206 responsive to assertion of the reset input 204. The time duration between assertion of the Q output 206 and de-assertion of the Q output 206 is controlled by a comparator 210 and a ramp circuit 212. The ramp circuit 212 is shown in the example form of a current source 214, a capacitor 216, and an electrically controlled switch 218 (hereafter just switch 218). The comparator 210 defines an inverting input 220, a non-inverting input 222, and a compare output 224. The compare output 224 is coupled to the reset input 204. The non-inverting input 222 is coupled to the ramp circuit 212, and the inverting input 220 is coupled to components that create an on-time reference (discussed more below).

The example current source 214 has an upper input coupled to a voltage source (e.g., internal power rail of the driver circuit 110), a current output coupled to the non-inverting input 222, and in the example of FIG. 2A a control input coupled to the voltage-sense input 156. Thus, the current source 214 produces a current, provided to the capacitor 216, and in the example of FIG. 2A the magnitude of the current is directly proportional to the input voltage $V_{IN}$. The voltage held on the capacitor 216 is periodically shorted or drained by way of the switch 218. That is, switch 218 is coupled across the capacitor 216 such that when the switch 218 is closed or conductive the current held on the capacitor 216 is shorted or drained, and when the switch 218 is open or non-conductive a ramp signal in the form of a voltage on the capacitor 216 is created. Each time the switch 218 opens, voltage on the capacitor 216 builds or rises over time at a particular ramp rate or slope controlled by the magnitude of the current provided from the current source 214. The conductive state of the switch 218 is controlled by the SR latch 200 and a minimum off-time circuit 226 (labeled just "off-time circuit" in the figure). In particular, the Q-not output 208 of the SR latch 200 is coupled to the minimum off-time circuit 226, and an output of the minimum off-time circuit 226 is coupled to the control input of the switch 218.

Consider, for purposes of explanation, that the PWM output 142 of the driver circuit 110 is de-asserted (and thus the overall switching power converter is in the discharge mode). Further consider, for now, that the minimum off-time has been achieved. When the set input 202 of the SR latch 200 is asserted, the PWM output 142 is asserted, and the Q-not output 208 is de-asserted. Immediately responsive to de-assertion of the Q-not output 208, the switch 218 is made non-conductive, and thus current flows from the current source 214 to the capacitor 216 creating the ramp signal. The SR latch 200 remains in the "set" state while the comparator 210 compares an on-time reference applied to the inverting input 220 to the ramp signal applied to the non-inverting input 222. When the ramp signal created by the ramp circuit 212 crosses the on-time reference, the comparator 210 asserts the compare output 224, which resets the SR latch 200, de-asserts the PWM output 142, and asserts the Q-not output 208. However, the minimum off-time circuit 226 delays assertion of the control input to the switch 218 to implement the minimum off-time. It follows that the ramp signal created by the ramp circuit 212 continues to rise (or perhaps saturations at the voltage of the voltage rail), and thus holds the compare output 224 in an asserted state to implement the minimum off-time. After the expiration of the minimum off-time, the control input of the switch 218 is asserted, the voltage and current from the capacitor 216 is drained, and the on-time controller 130 is ready for the next assertion of the set inputs 144 and 202.

In example systems, the on-time controller 130 implements the secondary response that adjusts or controls the on-time associated with each charge mode to bring the switching frequency back to the setpoint frequency. To that end, the on-time controller 130 further comprises a frequency controller in the example form of a frequency comparison circuit 228 (e.g., a phase locked loop) and a low-pass filter 230. In particular, the frequency comparison circuit 228 has a first input coupled to the Q output 206 of the SR latch 200, and a second input coupled to a signal indicative of setpoint frequency. The frequency comparison circuit 228 thus receives a signal indicative of the switching frequency on the first input. The frequency comparison circuit 228 produces a signal indicative of a frequency difference between the switching frequency of the overall controller (as read from the Q output 206) and the setpoint frequency—frequency error. In the example system of FIG. 2A, the signal indicative of the frequency error is applied to the low pass filter 230, summed with the compensation signal, and the resultant is the on-time reference applied to the inverting input 220. The combination of the frequency comparison circuit 228 and low pass filter 230 implement a transfer function to implement the secondary response that controls the on-time to bring the switching frequency back to the setpoint frequency. Characterized in terms of proportional-integral-differential (PID) control, the combination of the frequency comparison circuit 228 and the low pass filter 230 may be considered to implement integral-only control, or integral-dominated control, such that the secondary response is slower than the primary response of the system.

The example on-time controller 130 of FIG. 2A further comprises a summation block 232 disposed between the low pass filter 230 and the inverting input 220. In particular, the summation block 232 defines a first input coupled to the low pass filter 230, a second input coupled to the compensation input 146, and a summation output coupled to the inverting input 220. As the name implies, the summation block 232 sums a compensation signal driven to the compensation input 146 with the output of the low pass filter 230 to create the on-time reference applied to the inverting input 220 of the comparator 210. Creation of the compensation signal is discussed more below in relation to the bypass controller 134. Modifying the on-time reference by way of the compensation signal and the summation block 232 has the effect of changing the on-time even after a charge mode has begun.

Consider again a situation in which the PWM output 142 of the driver circuit 110 is de-asserted and that the minimum off-time has been achieved. When the set input 202 of the SR latch 200 is asserted, the PWM output 142 is asserted, and the switch 218 is made non-conductive. Current thus flows from the current source 214 to the capacitor 216 creating the ramp signal. Further consider that, prior to the ramp signal crossing the on-time reference, a step increase in power consumption occurs. Responsive to the step increase in power consumption, a magnitude of the compensation signal applied to the compensation input 146 increases, and thus the magnitude of the on-time reference applied to the inverting input 220 increases. It follows that the ramp signal created on the capacitor 216 will rise to a higher magnitude before crossing the on-time reference. And it follows that the on-time of the charge mode will be longer in this example, with the additional length of time implemented within the active charge mode.

Now consider the opposite case. Again, consider that the PWM output 142 of the driver circuit 110 is de-asserted and that the minimum off-time has been achieved. When the set input 202 of the SR latch 200 is asserted, the PWM output 142 is asserted, and the switch 218 is made non-conductive. Current thus flows from the current source 214 to the capacitor 216, creating the ramp signal. Further consider that, prior to the ramp signal crossing the on-time reference, a step decrease in power consumption occurs. Responsive to the step decrease in power consumption, the magnitude of the compensation signal applied to the compensation input 146 decreases, and thus the magnitude of the on-time reference applied to the inverting input 220 decreases. It follows that the ramp signal created on the capacitor 216 crosses the on-time reference at a lower magnitude. And it follows that the on-time of the charge mode will be shorter in this example, with the shortened length of time implemented within the active charge mode.

Figure 2B:
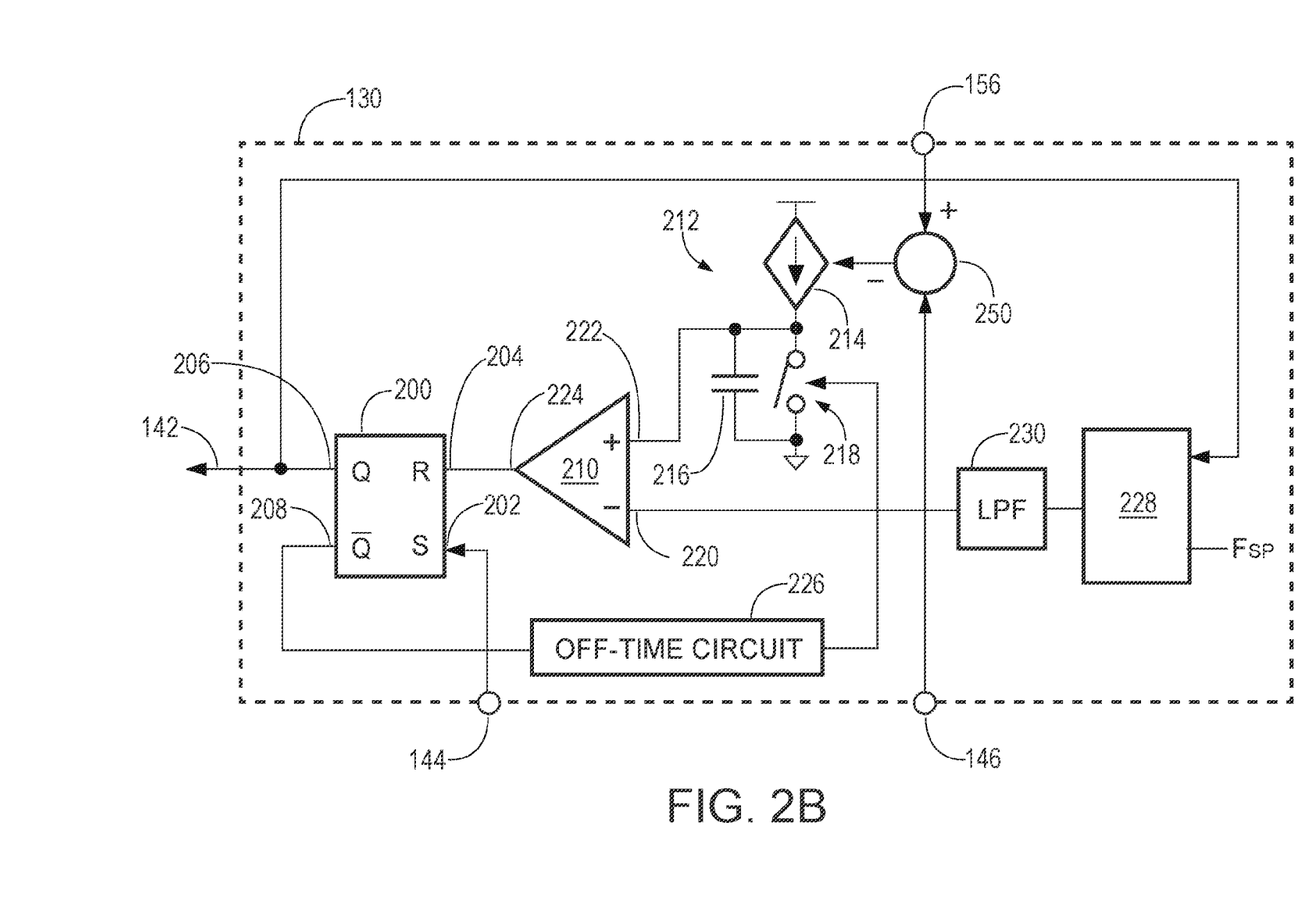
FIG. 2B shows a block diagram of an on-time controller in accordance with at least some embodiments.

FIG. 2B shows a block diagram of another example on-time controller 130. The on-time controller 130 of FIG. 2B is closely related to the on-time controller of FIG. 2A, but the compensation signal operates on the ramp signal produced by the ramp circuit 212 rather than the on-time reference. Many of the components of the on-time controller 130 of FIG. 2B, and their operation, are the same as with respect to FIG. 2A. Shared components between FIGS. 2A and 2B thus carry the same reference numbers, and are not introduced again in reference to FIG. 2B.

A first difference regarding the on-time controller 130 of FIG. 2B is creation of the on-time reference applied to the inverting input 220 of the comparator 210. As before, the frequency comparison circuit 228 produces a signal indicative of a frequency difference between the switching frequency of the overall controller (as read from the Q output 206) and the setpoint frequency—frequency error. In the example system of FIG. 2B, the signal indicative of the frequency error is applied to the low pass filter 230, and the filtered output of the low pass filter 230 is directly the on-time reference applied to the inverting input 220.

Another difference regarding the on-time controller of FIG. 2B is application of the compensation signal. The example on-time controller 130 of FIG. 2B comprises a subtraction block 250 defining a first sum input coupled to the voltage-sense input 156, a second sum input coupled to the compensation input 146, and a sum output coupled to the control input of the current source 214. As the name implies, the subtraction block 250 subtracts a compensation signal received on the compensation input 146 from the signal indicative of input voltage received on the voltage-sense input 156. The resultant signal becomes a current reference applied to the control input of the current source 214. Creation of the compensation signal is discussed more below in relation to the bypass controller 134. Modifying the on-time reference by way of the compensation signal and the subtraction block 250 also has the effect of changing the on-time even after a charge mode has begun. Thus, the current source 214 produces a current, provided to the capacitor 216, and the magnitude of the current is proportional to the input voltage $V_{IN}$ and the compensation signal supplied to the compensation input 146.

Consider again a situation in which the PWM output 142 of the driver circuit 110 is de-asserted and that the minimum off-time has been achieved. When the set input 202 of the SR latch 200 is asserted, the PWM output 142 is asserted, and the switch 218 is made non-conductive. Current thus flows from the current source 214 to the capacitor 216 creating the ramp signal. Further consider that, prior to the ramp signal crossing the on-time reference, a step increase in power consumption occurs. Responsive to the step increase in power consumption, a magnitude of the compensation signal applied to the compensation input 146 increases. The increase in the magnitude of the compensation signal decreases the magnitude of the current reference applied to the control input of the current source 214. A lowered magnitude of the current reference decreases the current flow through the current source 214. It follows that the slope of the ramp signal created on the capacitor 216 will be lower and the ramp signal will take longer rise high enough to cross the on-time reference. And it follows that the on-time of the charge mode will be longer in this example, with the additional length of time implemented within the active charge mode.

Now consider the opposite case. Again, consider that the PWM output 142 of the driver circuit 110 is de-asserted and that the minimum off-time has been achieved. When the set input 202 of the SR latch 200 is asserted, the PWM output 142 is asserted, and the switch 218 is made non-conductive. Current thus flows from the current source 214 to the capacitor 216, creating the ramp signal. Further consider that, prior to the ramp signal crossing the on-time reference, a step decrease in power consumption occurs. Responsive to the step decrease in power consumption, a magnitude of the compensation signal applied to the compensation input 146 decreases. The decrease in the magnitude of the compensation signal increases the magnitude of the current reference applied to the control input of the current source 214. A higher magnitude of the current reference increases the current flow through the current source 214. It follows that the slope of the ramp signal created on the capacitor 216 will be higher and the ramp signal will rise more quickly toward the on-time reference. And it follows that the on-time of the charge mode will be shorter in this example, with the shortened length of time implemented within the active charge mode.

Figure 3:
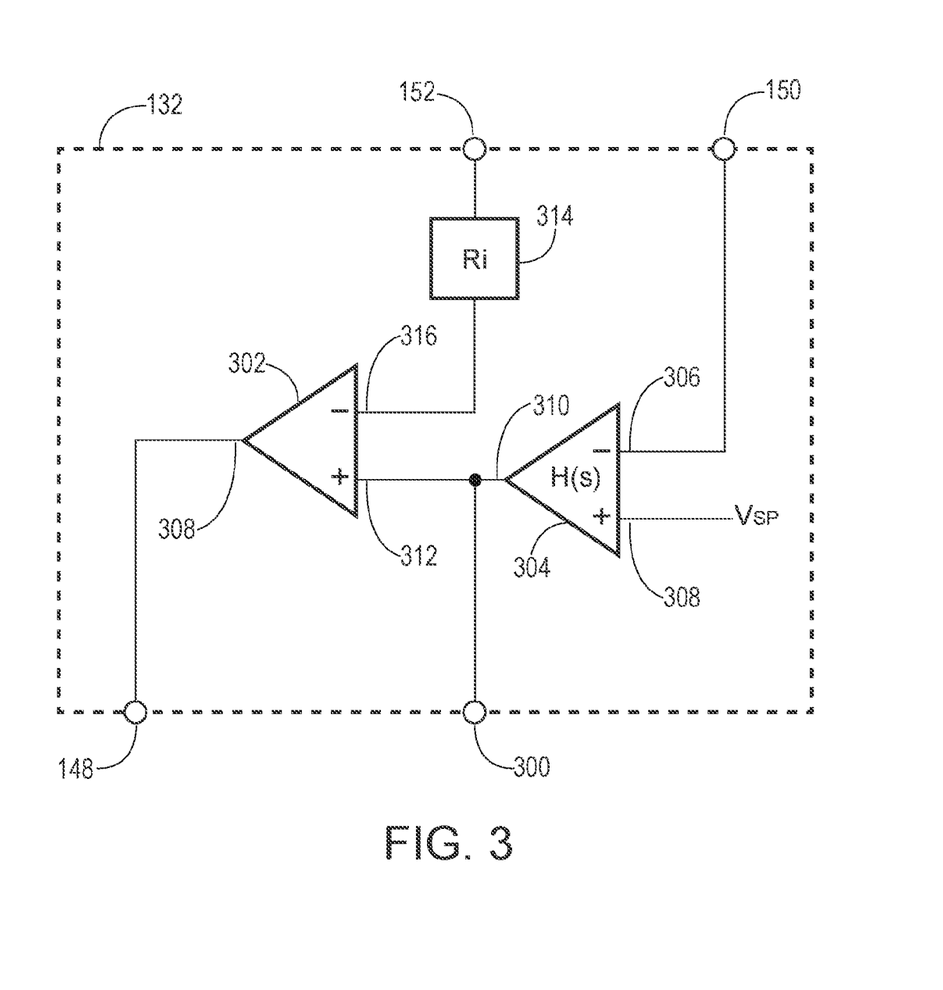
FIG. 3 shows a block diagram of a primary voltage controller in accordance with at least some embodiments.

FIG. 3 shows a block diagram of an example primary voltage controller 132. In particular, the example primary voltage controller 132 defines the feedback input 150, a voltage-error output 300, and the set output 148. The example primary voltage controller 132 implements current control, and thus also defines the current-sense input 152. In hysteretic control or voltage control, the current-sense input may be omitted.

Internally, the example primary voltage controller 132 defines a comparator 302 and an amplifier system 304 that implements a transfer function H(s). The amplifier system 304 illustratively defines an inverting input 306 coupled to the feedback input 150, and thus the amplifier system 304 receives a signal indicative of the output voltage $V_{OUT}$. The amplifier system 304 further defines a non-inverting input 308 coupled to a setpoint voltage $V_{SP}$, being the setpoint for the output voltage $V_{OUT}$. The example amplifier system 304 performs several functions. First, the amplifier system 405 creates signal proportional to a voltage difference between the output voltage $V_{OUT}$ and the setpoint voltage $V_{SP}$ (e.g., the voltage error signal). Using voltage error signal the amplifier system 304 implements the primary voltage control for the switching power converter. In some cases, the amplifier system 304 implements PID control (e.g., a Type III Compensation Network) using the voltage error signal. In the example system of FIG. 3 implementing current control, the amplifier system 304 creates, at a control output 310, a control signal indicative of start current. The control signal indicative of start current is applied to the non-inverting input 312 of the comparator 302. The control signal indicative of start current is related to voltage error in the sense that the greater the voltage error (e.g., the greater the difference between the output voltage $V_{OUT}$ and the setpoint voltage $V_{SP}$), the greater the magnitude of the signal indicative of start current such that next charge mode begins earlier.

The current-sense input 152 is coupled to a resistive circuit 314 that converts the current signal into a voltage, thus creating a signal proportional current in the inductor. The signal indicative of current in the inductor is applied to the inverting input 316 of the comparator 302. The comparator 302 thus compares the control signal indicative of start current to the signal proportional to current in the inductor. When the signal proportional to current in the inductor falls through or crosses the control signal indicative of start current, the comparator 302 asserts the comparator output 318 and thus the set output 148. As discussed above with respect to the on-time controller 130, asserting the set output 148 begins the next charge mode of the switching power converter. Finally, in the example system the control output 310, which carries the control signal indicative of start current, is also coupled to and defines the voltage-error output 300.

Related-art devices have attempted to address the shortcomings of quasi-constant on-time controllers and timing of transient load changes by use of a secondary response implementing first derivative or differential-only control (e.g., use a high-pass filter). That is, step changes in voltage error caused by steep load transients have high first derivate values, and in the theoretical systems the first derivative values are used to drive on-time changes. The inventor of the present specification has found, however, that secondary responses in the form of differential-only control do not work well in practice. In particular, all circuits constructed on an insulator (e.g., silicon) are subject to crosstalk noise. For example, the conductive traces that feed the signal indicative of output voltage $V_{OUT}$ and the setpoint voltage to a comparator to create the voltage error signal may cross over or under power traces and traces carrying time varying signal. In the context of a driver circuit for a quasi-constant on-time controller, many of the parasitic signals induced by crosstalk have frequency components at the active frequency of the derivative-only secondary response. Thus, such parasitic signals improperly influence on-time, making the actual circuits unstable. Filtering of such parasitic signals has the detrimental effect of also filtering the desirable first derivative signals.

Returning briefly to FIG. 1. Example embodiments address, at least in part, the issues associated with the steep load transients, and also the issues associated with parasitic signals, by implementing the bypass controller 134 using proportional control, and in some cases proportional-only control.

Figure 4:
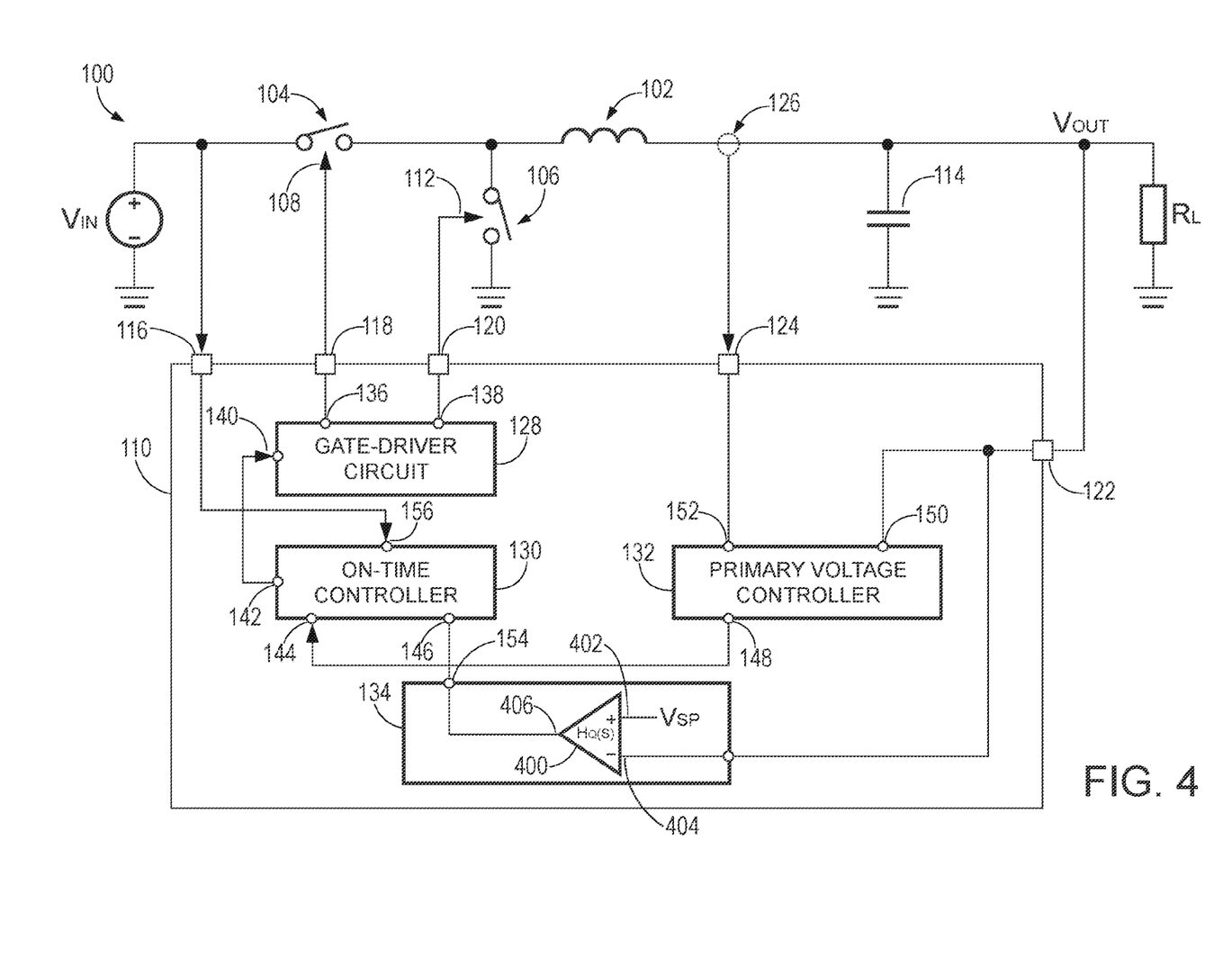
FIG. 4 shows a block diagram of a switching power converter in accordance with at least some example embodiments.

FIG. 4 shows a block diagram of an example switching power converter. In particular, FIG. 4 shows a block diagram of an example bypass controller 134 in greater detail. In the example system, the bypass controller 134 is shown as an amplifier system 400 that implements a transfer function $H_Q(S)$. The amplifier system 400 illustratively defines a non-inverting input 402 coupled to the setpoint voltage $V_{SP}$, an inverting input 404 coupled to the feedback terminal 122, and a compensation output 406 coupled to the compensation input 146 of the on-time controller 130. The example amplifier system 400 performs several functions. First, the amplifier system 400 creates signal proportional to a voltage difference between the output voltage $V_{OUT}$ and the setpoint voltage $V_{SP}$ (e.g., a voltage error or voltage error signal). Using the voltage error signal the amplifier system 400 implements the secondary response by driving the compensation signal to the on-time controller 130, the compensation signal proportional to the voltage error signal. In some cases, the amplifier system 400 implements proportional-only control using the voltage error signal. Referring simultaneously to FIGS. 2A and 4, in example implementations the compensation signal created by the amplifier system 400 is summed with the signal indicative of the frequency difference from the low pass filter 230 to create the on-time reference. The on-time reference may thus take the mathematical form:

$$V_{ON\text{-}TIME} = -V_{OUT} * H_Q(S) + V_{FREQ} \qquad (1)$$

where $V_{ON\text{-}TIME}$ is the on-time reference, $H_Q(S)$ is the transfer function of the amplifier system 400 in the Laplace domain, and $V_{FREQ}$ is the signal indicative of the frequency error. Again, in the example embodiment the transfer function $H_Q(S)$ implements a modification of the on-time reference $V_{ON\text{-}TIME}$ directly proportional to the voltage error, and more particularly the transfer function $H_Q(S)$ implements a modification of the on-time reference Vc only proportional to the voltage error (e.g., proportional-only control in the context of PID control).

Referring simultaneously to FIGS. 2B and 4, in example implementations the compensation signal created by the amplifier system 400 is subtracted from the signal indicative of input voltage to create the current reference. In the example case of FIG. 2B, the frequency difference from the low pass filter 230 directly becomes the on-time reference (e.g., $V_{ON\text{-}TIME} = V_{FREQ}$). The current reference applied to the control input of the current source may thus take the mathematical form:

$$I_C = V_{IN} - H_Q(S) * (V_{SP} - V_{OUT}) \qquad (2)$$

where $I_C$ is the current reference, $H_Q(S)$ is the transfer function of the amplifier system 400 in the Laplace domain, and $V_{SP}$ is the set point voltage. The current from the current source may thus take the mathematical form:

$$I_{TON} = Ki * I_C \qquad (3)$$

where $I_{TON}$ is the current produce by the current source, and Ki is gain factor of the current source. It follows that the on-time may thus take the mathematical form:

$$T_{ON} = C*V_{ON\text{-}TIME}/\text{Ki}\int 1/I_C dt \quad (4)$$

where $T_{ON}$ is the on-time, C is the capacitance of capacitor 216, and the remaining variables are as described above. Thus, while the bypass response is proportional only, or proportional dominated, the capacitance results in an integral response sampled at the switching frequency. The integral component of the capacitor in the embodiments of FIG. 2B thus combine a fast response and integral robustness over spikes and noise experienced at the output voltage $V_{OUT}$.

Figure 5:
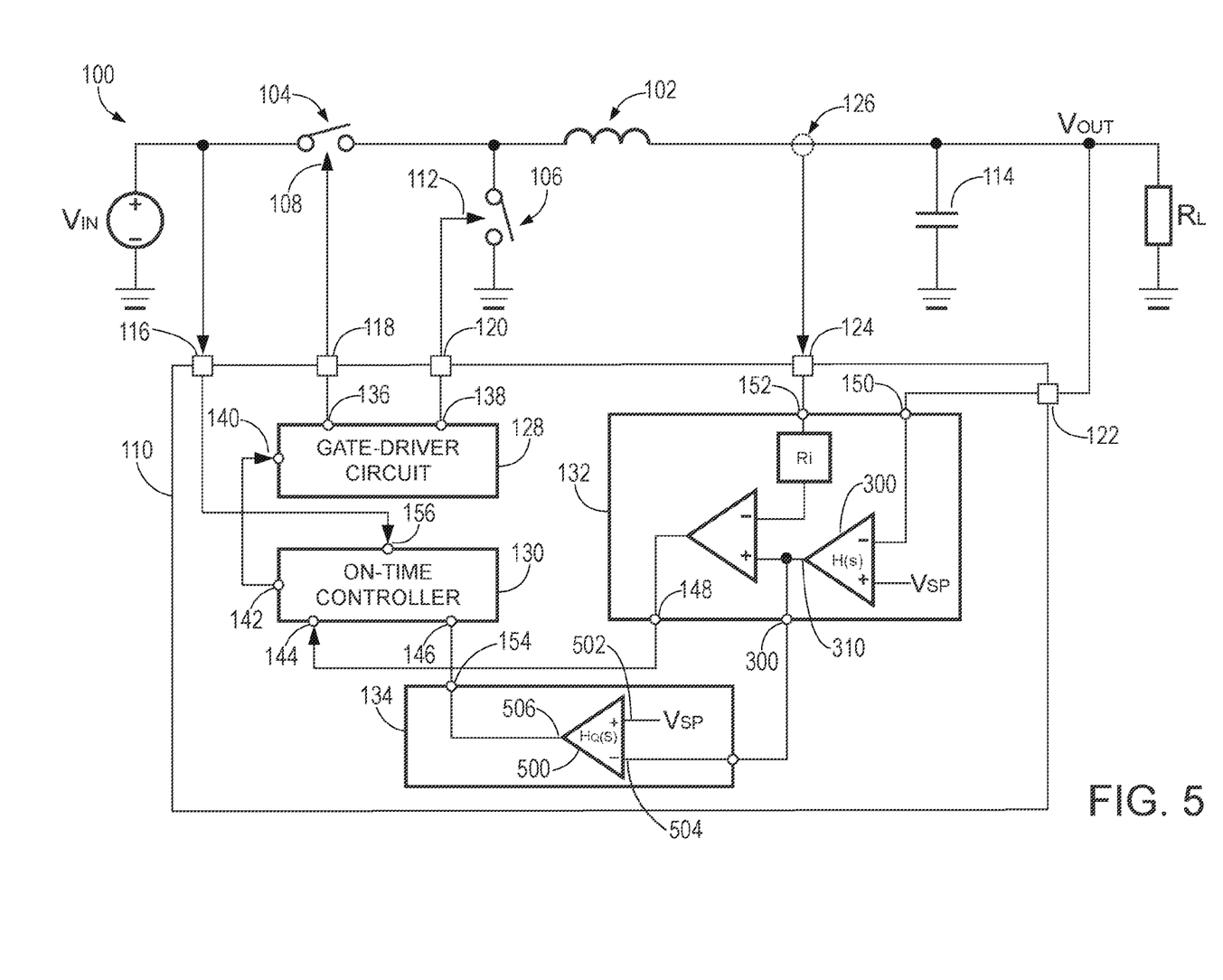
FIG. 5 shows a block diagram of a switching power converter in accordance with at least some example embodiments.

FIG. 5 shows a block diagram of an example switching power converter. In particular, FIG. 5 shows a block diagram of an example bypass controller 134 in greater detail, along with a block diagram of the example primary voltage controller 132. In the example system, the bypass controller 134 comprises an amplifier system 500 that implements the transfer function $H_{Q1}(S)$. The non-inverting input 502 is coupled to the setpoint voltage $V_{SP}$, and the inverting input 504 is coupled to the control output 310 carrying the control signal indicative of start current, and thus in the arrangement of FIG. 5 the amplifier system 500 operates on the control signal indicative of start current created by the amplifier system 304. The example amplifier system 500 creates signal proportional to a voltage difference between signal driven to the control output 310 and the setpoint voltage $V_{SP}$. Inasmuch as the signal driven to the control output 310 (i.e., the control signal indicative of start current) is proportional to the output voltage $V_{OUT}$, in the example system a voltage error signal is created. Using voltage error signal the amplifier system 500 implements the secondary response by driving the compensation signal to the on-time controller 130. In the arrangement of FIG. 5, again the amplifier system 500 may implement proportional-only control using the voltage error signal. Referring simultaneously to FIGS. 2A and 5, the compensation signal created by the amplifier system 500 is summed with the signal indicative of the frequency difference from the low pass filter 230 to create the on-time reference. In the arrangement of FIG. 5, the on-time reference may thus take the mathematical form:

$$V_{ON\text{-}TIME} = -V_{OUT}*H_{Q1}(S)*H(S) + V_{FREQ} \quad (5)$$

where $V_{ON\text{-}TIME}$ is again the on-time reference, $H_{Q1}(S)$ is the transfer function of the amplifier system 500 in the Laplace domain, H(S) is the transfer function of the amplifier system 304 in the Laplace domain, and again $V_{FREQ}$ is the signal indicative of the frequency difference. In the example embodiment the transfer function Hoi (S) implements a modification of the on-time reference $V_{ON\text{-}TIME}$ directly proportional to the voltage error, and more particularly the transfer function $H_{Q1}(S)$ implements a modification of the on-time reference $V_{ON\text{-}TIME}$ only proportional to the voltage difference (e.g., proportional-only control in the context of PID control).

Referring simultaneously to FIGS. 2B and 5, in example implementations the compensation signal created by the amplifier system 400 is subtracted from the signal indicative of input voltage to create the current reference. In the example case of FIG. 2B, the frequency difference from the low pass filter 230 directly becomes the on-time reference (e.g., $V_{ON\text{-}TIME} = V_{FREQ}$). The current reference applied to the control input of the current source may thus take the mathematical form:

$$I_C = V_{IN} - V_{OUT}*H_{Q1}(S)*H(S) \quad (6)$$

where $I_C$ is the current reference, $H_{Q1}(S)$ is the transfer function of the amplifier system 500 in the Laplace domain, and H(S) is the transfer function of the amplifier system 304 in the Laplace domain. Again, the current from the current source may take the mathematical form:

$$I_{TON} = \text{Ki}*I_C. \quad (7)$$

It follows that the on-time may thus again take the mathematical form:

$$T_{ON} = C*V_{ON\text{-}TIME}/\text{KI}\int 1/I_C dt \quad (8)$$

where the variables are as described above. Again, while the bypass response is proportional only, or proportional dominated, the capacitance results in an integral response sampled at the switching frequency.

Figure 6:
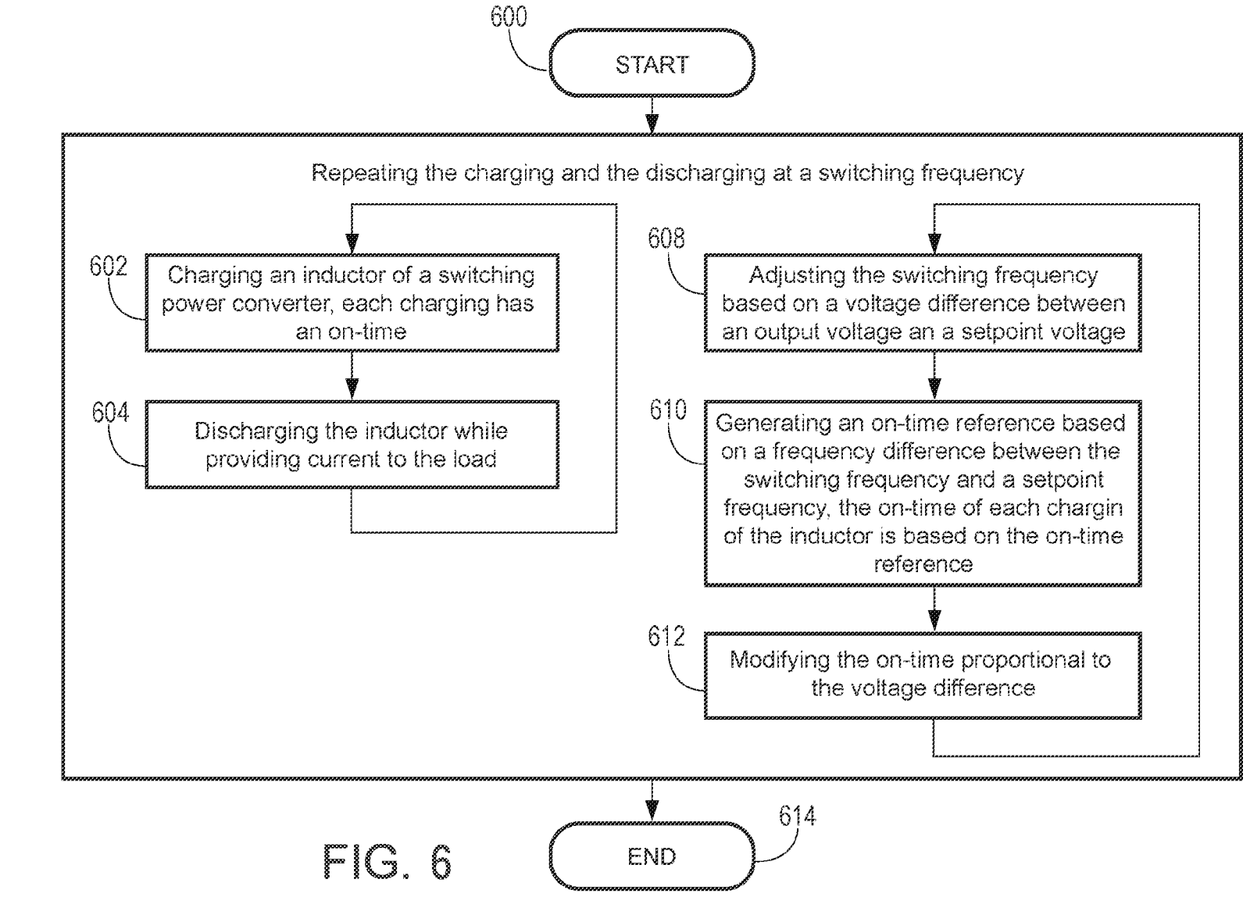
FIG. 6 shows a method in accordance with at least some embodiments.

FIG. 6 shows a method of operating a switching power converter in accordance with at least some embodiments. In particular, the method starts (block 600) and comprises: charging an inductor of a switching power converter, each charging has an on-time (block 602); and then discharging the inductor while providing current to the load (block 604); and repeating the charging and the discharging at a switching frequency (block 606). During the repeating, the method may comprise: adjusting the switching frequency based on a voltage difference between an output voltage and a setpoint voltage (block 608); generating an on-time reference based on a frequency difference between the switching frequency and a setpoint frequency, the on-time of each charging of the inductor is based on the on-time reference (block 610); and modifying the on-time proportional to the voltage difference (block 612). Thereafter, the methods ends (block 614).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, comprising:
   charging an inductor of a switching power converter, each charging has an on-time; and then discharging the inductor while providing current to a load;
   repeating the charging and the discharging at a switching frequency, and during the repeating:
   adjusting the switching frequency based on a voltage difference between an output voltage and a setpoint voltage; and
   modifying, during the charging, the on-time proportional to the voltage difference.

2. The method of claim 1 further comprising:
   generating an on-time reference based on a frequency difference between the switching frequency and a setpoint frequency, the on-time of each charging of the inductor based on the on-time reference; and
   wherein modifying the on-time further comprises modifying a magnitude of the on-time reference only proportional to the voltage difference.

3. The method of claim 1 wherein modifying the on-time further comprises modifying a slope of a ramp signal proportional to the voltage difference.

4. The method of claim 3 further comprising:
generating an on-time reference based on a frequency difference between the switching frequency and a setpoint frequency, the on-time of each charging of the inductor based on the on-time reference; and
wherein charging the inductor further comprises charging for the on-time determined based on the ramp signal crossing the on-time reference.

5. The method of claim 1 further comprising:
operating the power converter in a current mode in which each charging of the inductor begins when based on a current setpoint signal;
wherein modifying the on-time further comprises modifying based on the current setpoint signal.

6. The method of claim 1, wherein charging the inductor further comprises:
setting a first switch to a conductive state, and
setting a second switch to a non-conductive state.

7. A driver circuit for a switching power converter, comprising:
a voltage-sense terminal, a high-gate terminal, a low-gate terminal, and a feedback terminal;
an on-time controller defining a set input and a compensation input, the on-time controller coupled to the high-gate terminal and the low-gate terminal;
a voltage controller coupled to the set input and the feedback terminal, the voltage controller configured to assert the set input at a switching frequency, the switching frequency based on a voltage difference between a setpoint voltage and a signal indicative of output voltage sensed by way of the feedback terminal;
the on-time controller is configured to, responsive to assertion of the set input, start a charge mode by asserting the high-gate terminal and de-asserting the low-gate terminal;
the on-time controller is configured to maintain the charge mode for an on-time, the on-time having a duration based on a compensation signal received on the compensation input; and
a bypass controller coupled to the compensation input, the bypass controller configured to drive the compensation signal to the on-time controller, the compensation signal proportional to the voltage difference.

8. The driver circuit of claim 7 wherein when the bypass controller drives the compensation signal, the bypass controller is further configured to drive the compensation signal directly proportional to the voltage difference.

9. The driver circuit of claim 8 wherein when the bypass controller drives the compensation signal, the bypass controller is further drive the compensation signal only proportional to the voltage difference.

10. The driver circuit of claim 7 wherein when the on-time controller maintains the charge mode, the on-time controller is further configured to:
create an on-time reference based on the compensation signal;
create a ramp signal; and
maintain the charge mode for the on-time determined based on the ramp signal crossing the on-time reference.

11. The driver circuit of claim 10 wherein when the on-time controller creates the on-time reference, the on-time controller is further configured to sum the compensation signal with a signal proportional to a frequency difference between the switching frequency and a setpoint frequency.

12. The driver circuit of claim 7 wherein when the on-time controller maintains the charge mode, the on-time controller is further configured to:
create an on-time reference;
create a ramp signal based on the compensation signal; and
maintain the charge mode for the on-time determined based on the ramp signal crossing the on-time reference.

13. The driver circuit of claim 12 further comprising:
the on-time controller coupled to the voltage-sense terminal; and
wherein a slope of the ramp signal is based on the compensation signal and a signal indicative of input voltage sensed by way of the voltage-sense terminal.

14. The driver circuit of claim 13 further comprising the slope is proportional to a current reference created based on the compensation signal subtracted from the signal indicative of input voltage.

15. The driver circuit of claim 7:
wherein the voltage controller defines an error output; and
wherein the bypass controller further comprises a feedback input coupled to the error output, and wherein the bypass controller is configured to drive the compensation signal proportional to an error signal on the error output.

16. A system comprising:
an inductor defining a first lead and a second lead;
a first electrically-controlled switch defining a current input coupled to an input voltage, a current output coupled to the first lead, and a control input;
a second electrically-controlled switch defining a current input coupled to a ground reference, a current output coupled to the first lead, and a control input;
an output capacitor having a first connection coupled to the second lead of the inductor, and a second connection coupled to the ground reference;
a load coupled to the second lead of the inductor;
a driver circuit comprising:
an on-time controller defining a set input and a compensation input, the on-time controller coupled to the control input of the first electrically-controlled switch and the control input of the second electrically-controlled switch;
a voltage controller coupled to the set input, the voltage controller configured to assert the set input at a switching frequency, the switching frequency based on a voltage difference between an output voltage and a setpoint voltage;
the on-time controller is configured to, responsive to assertion of the set input, place the inductor in a charge mode by making the first electrically-controlled switch conductive and the second electrically-controlled switch non-conductive;
the on-time controller is configured to maintain the charge mode for an on-time, the on-time having a duration based on a compensation signal received on the compensation input; and
a bypass controller coupled to the compensation input, the bypass controller configured to drive the compensation signal to the on-time controller, the compensation signal proportional to the voltage difference.

17. The system of claim 16 wherein when the bypass controller drives the compensation signal, the bypass controller is further configured to create the compensation signal directly proportional to the voltage difference.

18. The system of claim 17 wherein when the bypass controller creates the compensation signal, the bypass controller is further configured create the compensation signal proportional only to the voltage difference.

19. The system of claim 16 wherein when the on-time controller maintains the charge mode, the on-time controller is further configured to:
  create an on-time reference;
  create a ramp signal; and
  maintain the charge mode for the on-time determined based on the ramp signal crossing the on-time reference.

20. The system of claim 16 wherein when the on-time controller maintains the charge mode, the on-time controller is further configured to:
  create an on-time reference;
  create a ramp signal based on the compensation signal; and
  maintain the charge mode for the on-time determined based on the ramp signal crossing the on-time reference.

* * * * *